Sept. 4, 1951 D. S. KING 2,566,943
DEWATERING OR DRYING OF PEAT
Filed Oct. 29, 1947 2 Sheets-Sheet 1

Inventor
Dudley Seaton King
by
Dowell & Dowell
Attorneys

Sept. 4, 1951 D. S. KING 2,566,943
DEWATERING OR DRYING OF PEAT
Filed Oct. 29, 1947 2 Sheets-Sheet 2
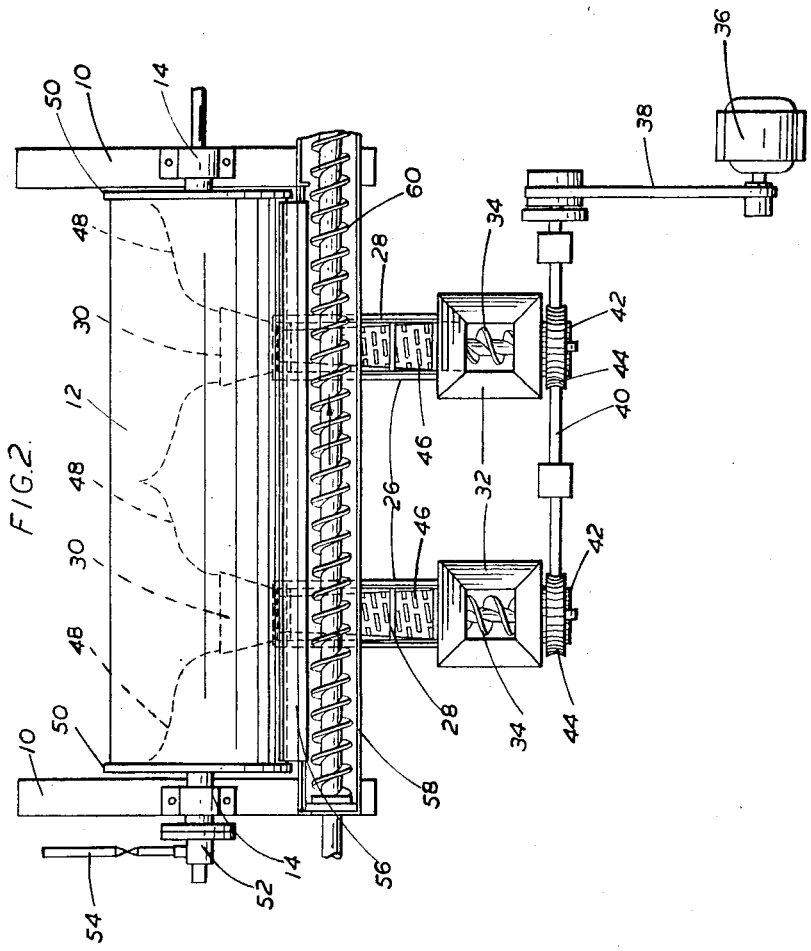
Inventor
Dudley Seaton King
by
Attorneys

UNITED STATES PATENT OFFICE 2,566,943

DEWATERING OR DRYING OF PEAT

Dudley Seaton King, London, England

Application October 29, 1947, Serial No. 782,867
In Great Britain September 30, 1946

1 Claim. (Cl. 34—112)

This invention relates to the de-watering or drying of peat.

As is well known, newly cut peat contains from 80% to 90% by weight of water and the elimination of this water is a difficult problem. Air drying is the method most commonly used. This is quite effective, but it takes a long time to complete and requires a great deal of space. Moreover, the condition of the finally produced product depends upon atmospheric conditions.

The removal of the water by heating is uneconomic because of the size of the installations required and also because of the very large amount of heat which is consumed. Attempts have also been made to remove the water in presses but the plant required is very expensive, a very large amount of power has to be used and the degree of dehydration which is achieved is disappointing.

According to the invention, the peat to be dewatered is extruded to a ribbon shape and the ribbon is compressed between two moving surfaces which reduce its thickness.

The apparatus in accordance with the invention can be of a simple form, comprising essentially an extruder having a fish-tail discharge nozzle arranged with its longer axis horizontal and a pair of horizontal rollers arranged one above the other.

A certain amount of water will be squeezed out of the peat during the extrusion and the barrel of the extruder can therefore, be provided with holes for evacuation of this water. The primary object of the extruder is however, not to effect the dewatering but to prepare the peat for presentation to the rollers.

It is, of course, important that the water which is removed from the peat by the rollers should not be allowed to come into contact again with the de-watered peat. This can be ensured by causing the ribbon of peat which leaves the extruder to travel slightly upwards to the nip of the rollers and to continue to travel upwards after passing through the nip. In the preferred form of apparatus in accordance with the invention, this upward path is contrived by setting the upper roller a little nearer the extruder than is the lower roller.

The use of large diameter rollers ensures that the squeezing of the ribbon is applied gradually and relaxed gradually. Rollers of about 24 inches diameter give very good results.

The rollers can also serve to remove water from the peat by the application of heat. In that case, it is, of course, of advantage to keep the peat in contact with a heated roller as long as possible. In the preferred form of the invention, the upper roller is steam heated and maintained at a higher temperature than the lower roller. This helps to keep the peat in contact with the upper roller after it has passed the nip of the rollers. It is also advantageous in this connection to provide the upper roller with a roughened surface.

In order that the invention may be thoroughly understood and be more readily carried into effect, examples of a machine in accordance with it will now be described with reference to the accompanying drawings in which:

Figure 2 is a plan view of the machine shown in Figure 1 and

Figure 1:
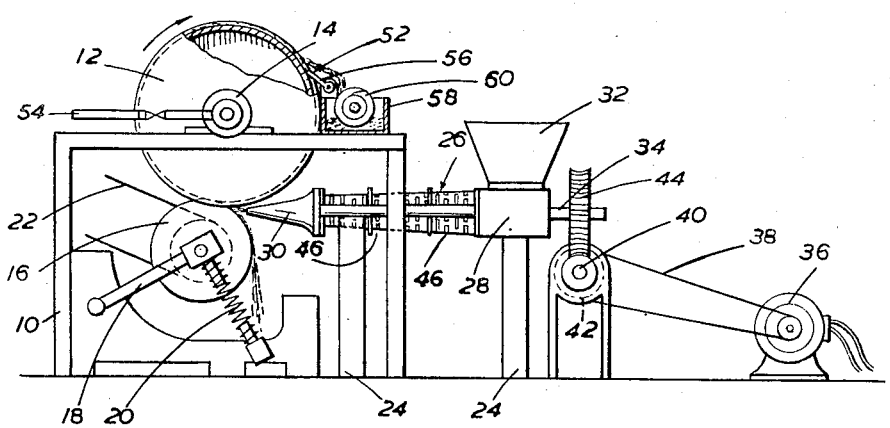
Figure 1 is a semi-diagrammatic side elevation of the preferred form of machine.

The machine shown in Figure 1 comprises a frame 10 on which is mounted a roller 12 in bearings 14. The frame also supports a lower roller 16 which is carried by pivotally mounted arms 18 and is urged into contact with the upper roller 12 by a spring 20. The lower roller is driven by means not shown through a belt 22.

A second frame 24 is provided which supports a pair of extruders 26. Each extruder has a tapering barrel 28, a fish-tail nozzle 30 and a feed hopper 32. In the barrel of each extruder is arranged a tapering Archimedean screw 34 driven by a motor 36 connected by a belt 38 to a shaft 40. Two worms 42 on the shaft 40 engage with worm wheels 44 on the ends of the screws 34.

The peat to be de-watered is fed into the hoppers 34 and is forced through the extruders by the screws 34. The cross sectional area of the outlet of the nozzle of the extruders is about the same as that of the barrels at the smaller end and, therefore, the peat is not highly compressed. The main object of the extruders is to present the peat to the rollers 12 and 16 to the best advantage. Some water will be squeezed out of the peat in the extruders and this is evacuated through slots 46 in the barrels 28.

The fish tail shape of the nozzles 30 causes the peat to be presented to the rollers 12 and 16 as fairly wide ribbons. These ribbons are then squeezed by the rollers and are thus spread out over the whole of the length of the rollers as indicated by the dotted lines 48 in Figure 2.

The peat is prevented from spreading beyond the ends of the rollers by flanges 50 on the roller 12.

It will be seen from Figure 1 that the roller 16 is set with its axis a little in front of that of the roller 12 and that the extruder nozzle 30 is set a little below the nip of the rollers. This ensures that the ribbon of peat is fed slightly upwards to the nip and that the water expressed from it by the rollers can run backwards on the roller 16 out of contact with the peat. To assist further in the evacuation of the expressed water, the surface of the lower roller 16 is made as smooth as possible. The surface of the upper roller is, however, roughened as, for example, by sand blasting, as this has a tendency to cause the peat to adhere to it. This tendency is increased if the temperature of the upper roller is maintained above that of the lower roller and, therefore, the upper roller is provided with a hollow shaft 52 connected by a pipe 54 to a source of steam (not shown). Steam at about 30 lbs./sq. in. is preferably used.

The longer the peat remains on the heated roller 12, the more moisture will be evaporated from it. There is, therefore, advantage in using a roller of large diameter, say 24 inches or more. The use of large rollers also has the advantage of applying the pressure to the peat gradually.

In the machine shown in Figure 1, the peat passes right over the roller 12 and is finally taken off by a scraper 56 which is pivotally mounted on a trough 58 containing an Archmedean screw 60 driven by means not shown. The dewatered peat which, by the time it reaches the trough 58, is in a crumbly condition, is further broken up by the screw 60 and is delivered to the collecting points. The speed of the rollers is preferably made variable so that the length of time during which the peat remains on the heated roller can be varied. A suitable speed for the roller 12, is in general, 5 revs. per min.

Figure 3:
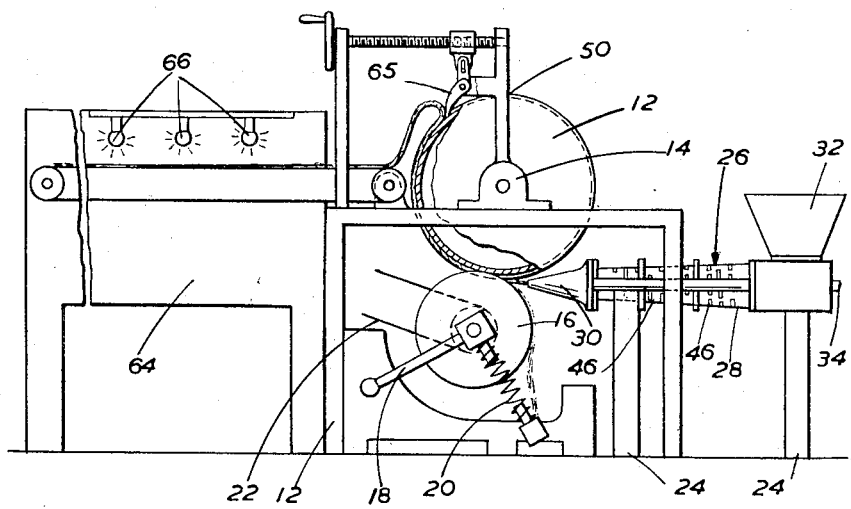
Figure 3 is a side elevation of a modified form of machine.

The machine shown in Figure 3 differs from that shown in Figure 1 only in that the peat is kept in contact with the upper roller 12 for a shorter time. The peat is removed from the roller by an adjustable scraper 62 and deposited on a conveyor 64 which moves beneath a number of heaters 66 which are preferably of the infra-red type.

The upper roller could, in both cases, be driven independently of the lower roller if desired.

Best results have so far been obtained with extruders producing a ribbon from 1 to 2 inches thick and about 12 inches wide and a top roller 24 inches in diameter and 96 inches long, supplied with steam at 30 lbs. per square inch, and driven at 5 revs. per minute.

I claim:

Apparatus for de-watering peat comprising a fish-tail nozzle set with its longer axis substantially horizontal, means for feeding the peat substantially horizontally to and through said nozzle, a lower roller, hollow upper roller forming a horizontal nip with said lower roller at a level slightly below that of the highest point in said lower roller, means for driving said rollers and means for passing steam through said hollow upper roller, said nozzle being disposed out of contact at least with said lower roller and being so disposed relatively to said nip that the peat issuing from said nozzle travels to said nip out of contact with said lower roller.

DUDLEY SEATON KING.

REFERENCES CITED

The following references are of record in the file of this patent:

UNITED STATES PATENTS

| Number | Name | Date |
|---|---|---|
| 785,600 | Ekenberg | Mar. 21, 1905 |
| 860,342 | Taylor | July 16, 1907 |
| 1,037,545 | Savy | Sept. 3, 1912 |
| 1,408,827 | Prescott | Mar. 7, 1922 |
| 1,481,410 | Brien | Jan. 22, 1924 |
| 2,068,181 | Hurxthal | Jan. 19, 1937 |
| 2,281,184 | Dykstra et al. | Apr. 28, 1942 |

FOREIGN PATENTS

| Number | Country | Date |
|---|---|---|
| 202,793 | Great Britain | Aug. 30, 1923 |
| 312,906 | Great Britain | Feb. 6, 1930 |